United States Patent

[11] 3,622,249

[72] Inventors Masaharu Hayashi;
Shoji Iwata; Uichiro Kobashi, all of Kariya, Japan
[21] Appl. No. 849,658
[22] Filed Aug. 13, 1969
[45] Patented Nov. 23, 1971
[73] Assignee Aisin Seiki Kabushiki Kaisha
Kariya City, Aichi, Pref., Japan
[32] Priorities Aug. 18, 1968
[33] Japan
[31] 43/70728;
Apr. 4, 1969, Japan, No. 44/30474

[54] FAN ASSEMBLY
7 Claims, 7 Drawing Figs.

[52] U.S. Cl. .................................................. 416/204, 416/241, 416/244
[51] Int. Cl. ...................................................... F04d 29/34
[50] Field of Search ......................................... 416/32, 38, 39, 169, 171, 214, 229, 230, 241, 207–209, 134, 244; 123/41.11, 41.12, 41.49, 41.65; 287/52.04, 53, 129 X

[56] References Cited
UNITED STATES PATENTS

| 2,381,567 | 8/1945 | Bonham | 416/169 X |
| 2,838,244 | 6/1958 | Oldberg | 123/41.12 X |
| 2,948,268 | 8/1960 | Roper et al. | 416/134 X |
| 3,014,568 | 12/1961 | Peras | 123/41.12 X |
| 3,245,476 | 4/1966 | Rodwick | 416/241 |
| 3,467,071 | 9/1969 | Elmer | 123/41.12 |

FOREIGN PATENTS

| 491,134 | 8/1938 | Great Britain | 287/129 |
| 976,237 | 11/1964 | Great Britain | 416/244 |

Primary Examiner—Everette A. Powell, Jr.
Attorney—Pierce, Scheffler & Parker

ABSTRACT: A fan assembly comprises a hub portion and blades made entirely of plastic material, the hub being secured to a driving member by means of bolts which pass through bolt holes in the hub. A bush inserted in each bolt hole is provided with an outwardly extending flange on each end thereof, one of which acts as a washer to separate the hub portion of the fan assembly from the driving member.

PATENTED NOV 23 1971 3,622,249
SHEET 1 OF 2
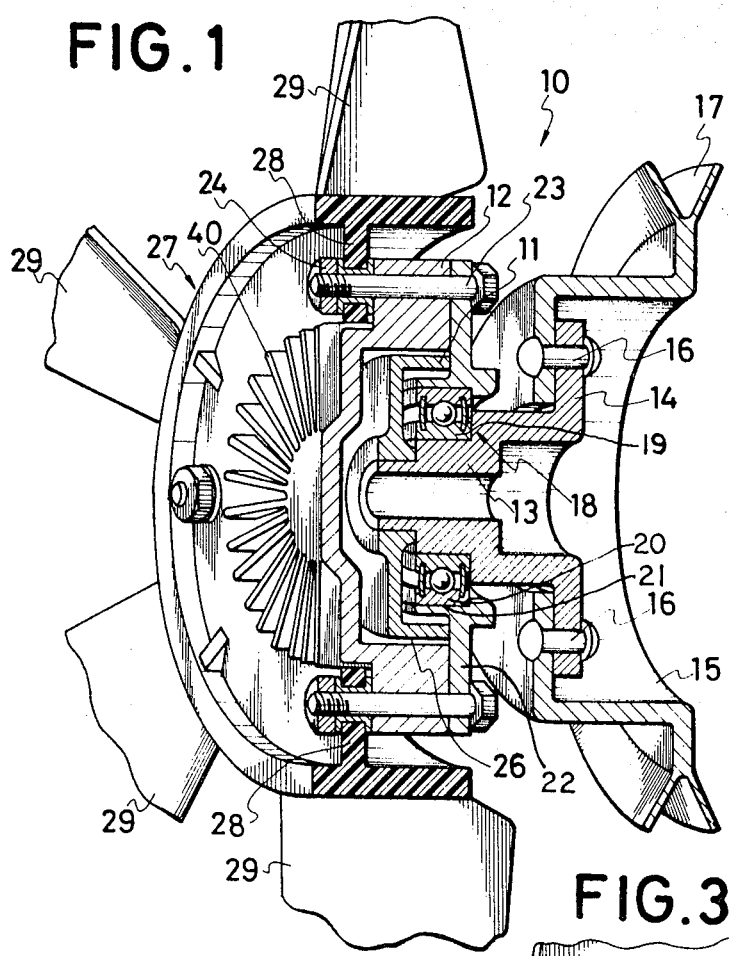
FIG.1
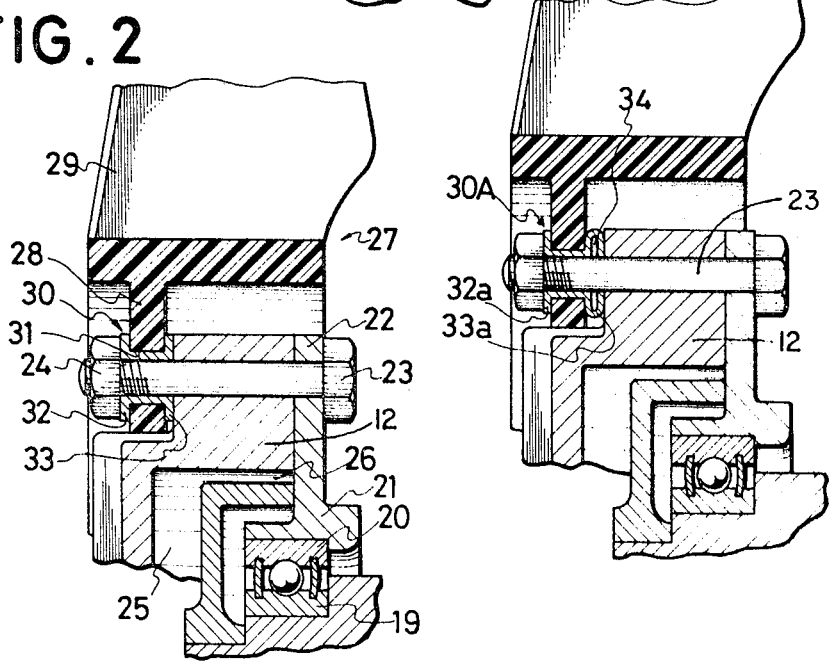
FIG.2
FIG.3

3,622,249

FAN ASSEMBLY

BACKGROUND OF THE INVENTION

This invention relates to bushes, more particularly to cooling fan assemblies wherein the fan hubs and the fan blades are all made from a plastics material, for use in automobiles.

The fan blades for cooling a radiator, recently, are made of such materials as plastics on account of simplicity of manufacturing and prevention of noises produced by the fan blades made of metals. On the other hand the fluid coupling member is attached to the fan assembly for regulating and controlling the cooling effect. The combination of the fan assembly and the fluid coupling member causes to transform, change in quality or at least get out of use a stem of the fan assembly to which the fluid coupling member is attached and the heat of the viscous fluid therein is transmitted.

To overcome the above-mentioned difficulties, it is well known, there is provided a washer or plate around an opening of the stem portion, or there is inserted a metal piece in the bore thereof.

The stem is, however, contracted due to the heat transmitted from the fluid coupling, or cracked due to "thermal shock" produced by the difference of character between the plastics materials and the metal materials.

SUMMARY OF THE INVENTION

The principal object of the present invention is to overcome the above mentioned disadvantages in the prior arts by providing new and improved fan assembly.

The invention provides a fan assembly comprising a hub portion and blades all made from a plastic material, wherein the hub portion is secured to a driving member by means of bolts passing through bolt-holes in the hub portion, each bolt-hole having inserted therein a bush with an outwardly extending flange at each end thereof. Further objects and advantages of the present invention will be apparent to those skilled in the art to which it relates from the following description thereof made with reference to the accompanying drawings forming a part of this specification.

BRIEF DESCRIPTION OF THE DRAWINGS

In the drawings:

FIG. 1 is a perspective view of an axial section through a fan assembly mounted on the output member of a fluid coupling, the tips of the fan blades not being shown;

FIG. 2 is a longitudinal section through a part of the assembly of FIG. 1, showing on an enlarged scale the means for securing the fan assembly to the coupling member;

FIG. 3 is a view similar to FIG. 2 and showing a first modification of this invention;

DETAILED DESCRIPTION

Figure 5:
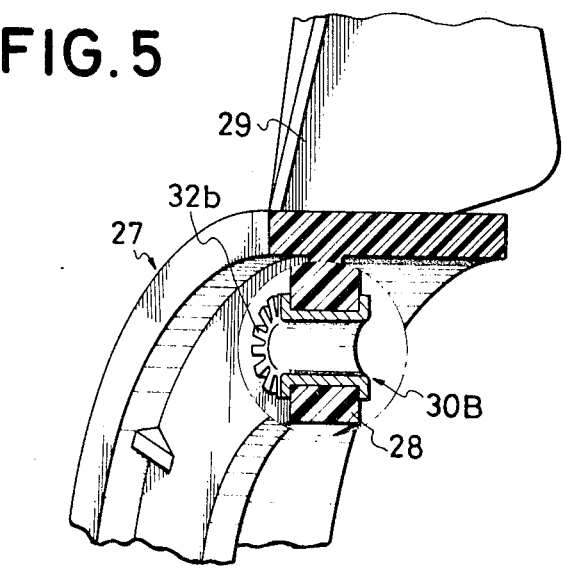
FIG. 5 is a fragmentary perspective view of the second modified bush attached to the fan assembly.

Referring to the drawings, especially FIG. 1 thereof, a conventional fluid coupling assembly 10 is provided with an input coupling member 11 and an output coupling member 12. The input coupling member 11 is securely mounted on an input shaft member 13 and is in the form of a flanged disc. It will be apparent that rotation of the shaft 13 causes the input coupling member 11 to be rotated.

The input shaft 13 has a flange 14 fixed to a pulley means 15 by suitable rivets 16. The pulley 15 may be driven by a prime mover, preferably an automotive engine, not shown, through a V-belt (again not shown) provided between a V-shaped slot 17 and a crank shaft of the engine, not shown.

A conventional ball bearing assembly 18 comprises an inner race 19 and an outer race 20. The inner race 19 is made rigid with the input shaft 13, while the outer race 20 is made rigid with the inner periphery of a tubular casing 21, a flange 22 which extends radially outwards from the tubular casing 21 being firmly secured to the output coupling member 12 by means of bolts 23 and nuts 24.

A fan assembly 27 which is made from a plastic material and comprises a stem portion 28 and cooling fan blades 29 is secured to the output coupling member 12 also by the bolts 23 and nuts 24 so as to rotate with the output member.

There is provided a fluid working or operating chamber 25 between the input coupling member 11 and the output coupling member 12, and a narrow annular gap 26 is provided therebetween. The provision of the radial gap 26 serves for power transmission relying upon the viscous shearing force forcibly induced in the viscous fluid such as silicon oil contained therein. More particularly, with rotation of the input coupling member 11, it accompanies therewith the viscous liquid from the oil pool having the usual liquid level and thus the liquid gradually fills the radial gap 26 around the inner coupling member 11, then gradually occupying an outer peripheral zone of the fluid operating chamber 25. By the viscous shearing force caused to take place by the rotation of the input coupling member 11 now surrounded by the viscous liquid, rotational movement is naturally transmitted through the intermediary of the viscous liquid to the output coupling member 12, thus the fan assembly 27 being caused to rotate in unison therewith. The temperature in the fluid working chamber 25 is increased due to the shearing resistance of the fluid, though cooling fins 40 are provided on the outer surface of the output member 12 so as to evolve heat.

The subject invention is clearly illustrated in FIG. 2 wherein a bush 30 passes through an opening 31 of the stem 28 so as to support the bolt 23 and the nut 24. When the nut 24 is tightened, one flange 32 of the bush 30 is compressed between the nut 24 and the stem 28 while the other flange 33 is compressed between the output member 12 and the stem 28. Thence the fan assembly 27 is rigidly connected to the fluid coupling member.

The heat flow from the rotatable output coupling member 12 to the fan assembly 27, which causes the stem 28 of the fan assembly to transform or change in quality, is obstructed by the spacing between the output coupling member and the fan assembly, which spacing is due to the presence of the flange 33 between those two bodies.

A first modified form of the bush is shown in FIG. 3 wherein the other flange portion 33a for separating the output coupling member 12 and the hub 28 is bent double. The heat transmitted from the output member 12 to the fan assembly 27 is very effectively blocked due to the double flange 33a and an air space 34 which is provided between the inner and outer walls of the double flange 33a. The method of equipping this bush 30A is as follows; the bush 30A, the double flange 33a thereof being beforehand formed and not yet formed one flange 32a thereof, is inserted in the opening 31 of the stem 28 from right-hand to left-hand in FIG. 3, then the stud 23 is pushed in the bush 30A also from right-hand to left-hand and the nut 24 is attached to the bolt 23, and then so rotated to advance towards right hand that one flange portion 32a is formed by means of clamping force of the nut 24 and the stem 28.

Figure 6:
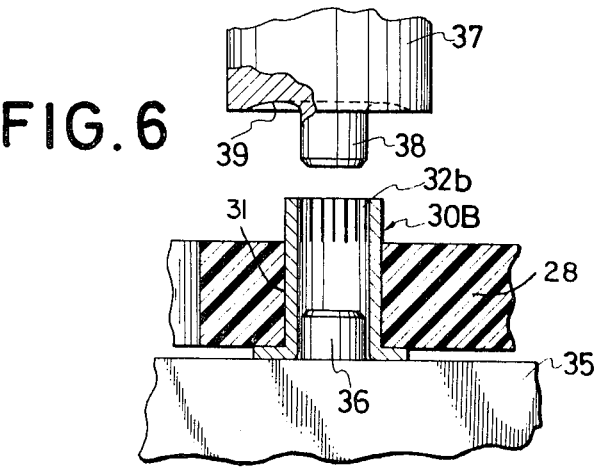
FIG. 6 is a partially sectioned view of the jig for caulking the bush of FIG. 4.
Figure 4:
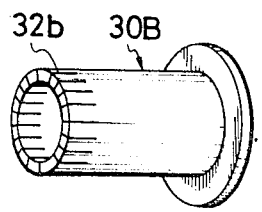
FIG. 4 is a perspective view of a second modification of this invention

A second modification is shown in FIG. 4 wherein the bush 30B, which is represented as a form before being caulked, is split on one end 32b of the bush 30B. The method of caulking the outer periphery 32b is seen in FIG. 6; an anvil block 35 includes a projection 36 the outside diameter of which is substantially equal to or less than the inside diameter of the bush 30B. After the bush 30B has been passed through the aperture in the hub 28, it is placed with the fan assembly 27 on the anvil 35, in other words, the projection 36 is inserted in the bore of the bush 30B. A vertically movably punch 37 comprises an another projection 38 and a concave surface 39. The projection 38 has a diameter substantially equal to or less than the inside diameter of the bush 30B. The concave portion 39 is provided so as to bend easily outwardly the longitudinally split portion 32b of the bush 30B as shown on an enlarged scale in the circular chain line of FIG. 5. The punch 37 is lower to caulk the bush 30B. Thence one flange portion is formed.

Figure 7:
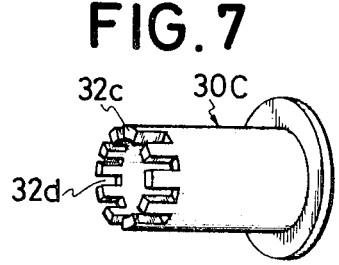
FIG. 7 is a view similar to FIG. 4 and showing a third modification of the present invention.

A third modified form of a bush is shown in FIG. 7 wherein the bush 30C, the form of which is similar to the bush 30B of FIG. 4, includes projections 30c and notches 32d on one end.

It is understood that the projections 32c of the bush 30C is formed to one flange as well as the split portion 32b of the bush 30B.

According to the bush 30B or the bush 30C, the split portion or projecting parts provide the stress at proper intervals around the opening 31 of the stem so that no sectional stress is supplied around the openings and the hardness of the stem portion is obtained, and no slackness between the bush and the stem is arisen even if the stem should be contracted due to the heat transmitted.

It will be recognized from the foregoing that according to this invention any crackes due to the stud and nut assemblies are not generated at the stem portion if the stem is connected to the input shaft member without intermediary of the fluid coupling member, and it is obtained a sufficient tightness between the bushes and the bolt and nut assemblies, both made of metals, on account of the same character of materials.

We claim:

1. A fan assembly for cooling radiators of automotive vehicles comprising a hub portion provided with blades extending therefrom and bolt holes therein, said hub portion and blades being made of a plastic material, a driving member, a plurality of bolts passing through the bolt holes and said driving member to secure said hub portion to said driving member, a bush inserted in each bolt hole, each bush having a first outwardly extending flange means at one end of each bush and disposed between said hub portion and said driving member and a second outwardly extending flange means at the other end of each bush, the outer end of said second flange means being pressed into the plastic hub portion, whereby said hub portion and said bush are firmly secured to each other to prevent creeping of said hub portion due to concentrated stress and/or thermal shock thereon.

2. A fan assembly as claimed in claim 1, wherein said driving member is the output member of a fluid coupling.

3. A fan assembly as claimed in claim 1, wherein the flange of each bush disposed between said hub portion and said driving member is bent double.

4. A fan assembly as claimed in claim 1 wherein said at least one end of each bush is split longitudinally thereof and wherein at least one of said flange means is formed by bending outwardly the split ends of the bush.

5. A fan assembly as claimed in claim 1, wherein said at least one end of each bush is provided with longitudinally extending notches and wherein at least one of said flange means is formed by bending outwardly the portions between the longitudinally extending notches.

6. A fan assembly as claimed in claim 3 wherein the end of each bush remote from said driving member is split longitudinally and wherein the flange means is formed by bending outwardly the split ends of the bush.

7. A fan assembly as claimed in claim 3 wherein the end of each bush remote from said driving member is provided with longitudinally extending notches and wherein the flange means is formed by bending outwardly the portions between the longitudinally extending notches.

* * * * *